United States Patent [19]

Pippin et al.

[11] 4,228,047
[45] Oct. 14, 1980

[54] STARCH COMPATIBLE POLYVINYL ACETATE LATICES

[75] Inventors: Wallace H. Pippin, Branchburg, N.J.; Wiley E. Daniels, Easton, Pa.

[73] Assignee: Air Products and Chemicals, Inc., Allentown, Pa.

[21] Appl. No.: 956,313

[22] Filed: Oct. 31, 1978

[51] Int. Cl.³ .................................................. C08L 3/02
[52] U.S. Cl. ..................... 260/17.4 ST; 260/29.6 RW; 526/209; 526/271
[58] Field of Search ................ 260/29.6 RW, 17.4 ST

[56] References Cited

U.S. PATENT DOCUMENTS

| 3,954,687 | 5/1976 | Wiest et al. | 260/17 A |
| 4,139,509 | 2/1979 | Matsunaga et al. | 260/17.4 ST |

FOREIGN PATENT DOCUMENTS 1148060 4/1969 United Kingdom ........... 260/29.6 RW

Primary Examiner—Edward M. Woodberry
Attorney, Agent, or Firm—Richard A. Dannells, Jr.; E. Eugene Innis

[57] ABSTRACT

Aqueous coating compositions comprising latices containing a copolymer of vinyl acetate in the range of about 95–99.9% by weight and maleic anhydride in the range of about 0.1–5% by weight have been found to have improved starch binder compatibility. Vinyl acetate and maleic anhydride are polymerized in an aqueous medium in the presence of a free radical initiator and a surfactant which prevents the vinyl acetate-maleic anhydride copolymer from dissolving in the aqueous medium. The resulting latex coating compositions have a high solids content (greater than about 50% by weight) and a copolymer particle size of under 0.5 microns in addition to the excellent starch compatibility.

17 Claims, No Drawings

STARCH COMPATIBLE POLYVINYL ACETATE LATICES

BACKGROUND OF THE INVENTION

1. Field of the Invention

The invention is directed to high solids vinyl acetate-maleic anhydride copolymer latex coating compositions having uniformly small particle size and improved starch compatibility.

2. Description of the Prior Art

Heretofore, copolymers of vinyl acetate and derivatives of alpha, beta-unsaturated dicarboxylic acids such as maleic anhydride, were polymerized in solution using an organic solvent such as ethyl acetate, ethyl alcohol, benzene or acetone and a free radical initiator such as benzoyl peroxide; see U.S. Pat. No. 2,637,712. Because of the use of such solution polymerized copolymers in coating compositions, one has had to employ varying techniques to achieve an effective composition. One such example is set forth in U.S. Pat. No. 3,799,902 in which a vinyl acetate-maleic anhydride copolymer is emulsified in the form of a water-in-oil emulsion. This technique requires the time-consuming step of grinding the copolymer to the desired particle size, e.g. in a range of 1-5 microns, and dispersing the particles in the water-in-oil emulsion. Typical solvents include benzene, xylene, toluene, mineral oils, kerosene and naphthas. The emulsification is done in the presence of a suitable emulsifying agent such as sorbitan monooleate.

Another example of a coating composition which encompasses vinyl acetate-maleic anhydride copolymers is found in U.S. Pat. No. 3,632,546. Specifically, a vinyl acetate-maleic anhydride copolymer is illustrated as being produced by solution polymerization, bulk polymerization, suspension polymerization or emulsion polymerization using a non-aqueous solvent. There is no suggestion in this reference of preparing such copolymers using aqueous emulsion polymerization techniques.

It is known to employ a copolymer vinyl acetate and maleic acid, not maleic anhydride, by polymerizing in an aqueous media in coating compositions; see U.S. Pat. No. 3,053,785. However, coating compositions using such a copolymer have not been found to have improved starch binder compatibility.

SUMMARY OF THE INVENTION

The coating compositions of the present invention comprise latices of a vinyl acetate-maleic anhydride copolymer containing vinyl acetate in the range of about 95 to 99.9% by weight and maleic anhydride in the range of about 5 to 0.1% by weight. The copolymerization of vinyl acetate and maleic anhydride takes place in an aqueous medium in the absence of a non-aqueous solvent or other organic media and in the presence of a free radical initiator and an emulsifying agent which prevents the vinyl acetate-maleic anhydride copolymer from dissolving in the aqueous medium.

In addition to the copolymer latex prepared in the foregoing manner, the coating composition contains mineral pigments and the usual paper coating additives, which may include defoamers, viscosity control additives, insolubilizers, lubricants, optical dyes and other adhesives or binders such as polyvinyl alcohol, casein, starch and protein.

The mineral pigments make up a majority of the coating composition of this invention, and the weight ratio of mineral pigments to latex can be in the range 3.33:1 to 50:1. The pigments can be any material well-known in the art for such purpose including hydrous aluminum silicates of kaolin group clays, hydrated silica clays, and other types of clays recommended in "Kaolin Clays and Their Industrial Uses", (1949) by J. M. Huber Corp., New York, Charters 10-16. In addition, other pigments can be added such as calcium carbonate, calcium sulfate, titanium dioxide, blanc fixe, lithopone, zinc sulfide, zinc oxide, plastic (polystyrene) pigments and the like.

The coating composition of this invention has a solids content of greater than 50% by weight and a uniform particle size of under 0.5 microns. Relatively large quantities, e.g. up to 9 parts by weight, of the more inexpensive binders such as starch per one part by weight of the latex binder can be incorporated into the coating composition of this invention without adversely affecting its coating properties.

PREFERRED EMBODIMENTS OF THE PRESENT INVENTION

The preferred coating compositions of this invention comprise latices of a vinyl acetate-maleic anhydride copolymer containing vinyl acetate in the range of about 98 to 99.6% by weight and maleic anhydride in the range of about 2 to 0.4% by weight. They have been found to have an excellent balance of emulsion and coating color characteristics including good mechanical stability, low viscosity, long shelf stability, cleanliness, fine uniform particle size in the range of 0.06 to 0.3 microns, unexpectedly high compatibility with ingredients including starch and other inexpensive binders within the desired viscosity range and adequate rheology. In addition, the compositions have excellent paper coating properties such as good optics, printing strength and ink receptivity.

The key element to achieving such a coating composition is the selection of a suitable surfactant to allow one to copolymerize the vinyl acetate monomer with maleic anhydride, but not to cause the resulting copolymer to solubilize in the aqueous polymerization medium. So long as this criteria is met, it is not critical whether the surfactant is a non-ionic, anionic, or cationic surfactant. In general, the anionic, cationic and non-ionic surfactants, which are useful in the present invention, are water soluble and contain from 10 to 22 carbon atoms in their hydrophobic moiety. Preferably the surfactants contain at least more than three ethylene oxide units in their hydrophilic moiety. It is known that anionic surfactants containing less than four ethylene oxide units cause solubilization of polyvinyl acetate; see H. A. Edelhauser and P. K. Isaacs, Journal of Applied Polymer Science, (1966) volume 10 at page 176. It has been found that such anionic surfactants are not useful in preparing the latex binders used in the coating compositions of this invention.

The generic class of the preferred anionic surfactants are those which are water soluble, dispersible and have the general formula $R(OCH_2CH_2)_nXM$ wherein R is an alkyl, alkaryl or cyclic alkyl radical having 10 to 22 carbon atoms, X is a sulfate, sulfonate, sulfosuccinate, or phosphate radical, M is an alkali or alkaline earth metal or an ammonium radical and n is an integer of 4 to 30.

Typical examples of anionic surfactants which have been found to be particularly effective in preventing the vinyl acetate-maleic anhydride copolymer from solubilizing in the aqueous polymerization medium include sodium sulfate ester of nonylphenoxypoly(ethyleneoxy)-ethanol dissolved in ethyl alcohol, which is sold under the trademark Polystep B-1; sodium sulfate ester of nonylphenoxypoly(ethyleneoxy)ethanol $[(C_9H_{19}C_4H_6)-O(CH_2CH_2O)_4SO_3Na]$, which is sold under the trademark Alipal CO-433; a sulfate ester of nonylphenoxypoly(ethyleneoxy)ethanol $[(C_9H_{19})C_4H_6-O(CH_2CH_2O)_{30}SO_3Na]$, which is sold under the trademark Polystep B-19; monosodium di-tridecyl sulfosuccinate; monosodium dioctyl sulfosuccinate; disodium dodecyl polyethylene oxide sulfosuccinate $[(CH_2CO(OCH_2CH_2)_5OC_{12}H_{25})(CHCOONa)(SO_3Na)]$ which is marketed under the trademark Aerosol A-102; disodium nonylphenyl polyethylene sulfosuccinate, $[(CH_2CO(OCH_2CH_2)_9.5O(C_6H_4)(C_9H_{19})(CHCOONa)(SO_3Na)]$, which is sold under the trademark Aerosol A-103; disodium-4-dodecyl-oxydibenzene sulfonate $[C_{12}H_{25}(C_6H_4SO_3Na)OC_6H_4SO_3Na]$, which is sold under the trademark Dowfax 2A-1; and any combination of the foregoing surfactants.

The cationic emulsifiers that may be employed are the acid salts of primary, secondary and tertiary amines and the quaternary ammonium-type surfactants including N-alkyl trimethylene diamines wherein the alkyl groups are derived from coconut, soya and tallow fatty acids.

Nonionic surfactants can be selected from the alkyl polyoxyethylene ethers and alcohols or polyethylene ethers and alcohols. Other such non-ionic surfactants include polyoxyalkenated alkyl phenols or alcohols having the general formula $R(OCHR'CHR')_nOH$, where R is an alkyl, aryl or alkaryl group having 10 to 22 carbon atoms, R' is an methyl radical or hydrogen and n is an integer of from 4 to 40. Typical nonionic surfactants include nonylphenoxypoly(ethyleneoxy)ethanol containing 97% by weight ethylene oxide, which is sold under the trademark Igepal CO-970; nonylphenoxypoly(ethyleneoxy)ethanol containing 63% by weight ethylene oxide which is sold under the trademark Igepal CO-630; nonylphenoxypoly(ethyleneoxy)ethanol containing 88% by weight ethylene oxide which is sold under the trademark Igepal CO-880; polyoxyethylenepolyoxypropylene glycols having the general formula: $HO(C_2H_4O)_n(C_3H_6O)_b(C_2H_4O)_cH$ wherein a, b and c are integers of 1 or above, which are sold under the trademark Pluronics; polyoxyethylated octyl phenol having 8—10 ethylene oxide units which are sold under the trademark Triton X-100; and combinations of the foregoing surfactants.

The surfactants which have been found to be particularly useful in preparing the latex binders for the compositions of the present invention are the anionic emulsifiers of the type discussed above either alone or in combination with the nonionic emulsifiers.

The copolymerization of vinyl acetate and maleic anhydride is initiated by free radical initiators which are water soluble including hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate and other inorganic initiators; symmetrical diacyl peroxides such as acetyl peroxide, propionyl peroxide, malonyl peroxide and succinoyl peroxide; ketone peroxides such as methylethyl ketone peroxide and cyclohexanone peroxide; and 2-azobis (isobutyronitrile), 2-azobis (2-methylbutyronitrile), and similar azo compounds.

The free radical initiator is present in the copolymerization reaction in the range of from about 0.05 to 5.0% by weight, preferably 0.1 to 3.0% by weight.

The free radical initiator or initiators can be used alone or in combination with a suitable reducing agent or activator such as alkali metal metabisulfites and pyrosulfites such as sodium metabisulfite, potassium metabisulfite, sodium pyrosulfite, ascorbic acid and metal salts thereof and the like. A common activator is sodium or potassium formaldehyde sulfoxylate sold under the trademark Formopon.

The amount of activator which can be employed in the copolymerization reaction ranges from 0.0001 to about 3.0 by weight based on the amount of vinyl acetate monomer to be copolymerized. In a preferred embodiment, the amount required is about 0.001 to 0.1% by weight of the vinyl acetate monomer.

Although various aqueous emulsion polymerization techniques may be employed in preparing the latex binders of the coating compositions of this invention, a particularly preferred method is to subject the maleic anhydride and vinyl acetate monomer mixture to a delayed addition procedure. This procedure comprises adding the vinyl acetate monomer and activator to a reaction vessel containing deionized water, surfactant, and free radical initiator while maintaining the temperature within the range of 40° to 100° C., preferably 45° to 60° C. The pressure in the vessel is maintained at substantially atmospheric pressure, although pressures in the range of atmospheric to 1,000 psig can be employed and preferably atmospheric to 500 psig. After the initial charge of vinyl acetate monomer and an activator has been introduced into the vessel, a solution of vinyl acetate and maleic anhydride is added. The final delayed charge of additional surfactant dissoived in the water is then added to the reaction mixture, and the temperature is maintained at the same conditions as in the initial charge. The pH of the aqueous reaction mixture during the copolymerization is maintained slightly on the acidic side by using small amounts of a buffer such as phosphates, acetates, ammonium hydroxide and the like.

The relative proportions of the components which can be included in typical commercial coating compositions of this invention in parts by weight per 100 parts of total pigmentation on a dry basis is as follows:

| | Parts |
|---|---|
| Clay (with or without other pigments, e.g. titanium dioxide and calcium carbonate) | 100 |
| Vinyl acetate-maleic anhydride copolymer latex | 2–30 |
| Other binders, e.g. starch | 0–25 |
| Insolubilizer | 0.5–5 |
| Dispersing agent | 0.05–0.5 |
| Viscosity control additives | 0.5–5 |
| Defoaming agent | 0.05–0.4 |
| Lubricant | 0.5–2 |
| Water - sufficient to provide a color solids content of up to 68% by weight. | |

Some examples of suitable insolubilizers include melamine formaldehyde, urea formaldehyde, glyoxal; dispersing agents include tetrasodium pyrophosphate and trisodium polyphosphate; viscosity control agents include sodium alginate, hydroxyethyl-cellulose, carboxymethyl cellulose, polyvinyl alcohol and polyacrylate; and lubricants include amide, paraffin, polyethylene and ester waxes. Defoaming agents are available under a variety of proprietary trademarks such as SURFYNOL 104A Surfactant (50 wt. % 2,4,7, 9-tetramethyl 5-decyn-4,7-diol and 50 wt. % ethyl hexanol); Nopco 122 and Nopco 124; Foammaster AP and Foammaster VF; Drew Chemical L-447 and Y-281; and Colloid Chemical 681F. The specific defoamer to use depends on the particular coating composition and the mill water composition, the exact selection of which is well-known to those skilled in the paper coating art.

The improved coating composition of this invention can be applied to a fibrous web of paper by any conventional means such as an air knife, rod coater, roll coater, and blade coater. Details of one such coater which is effective in the application of the present coating composition is found in U.S. Pat. No. 3,404,112, column 8, lines 49 to 75, which is incorporated herein by reference.

The use of maleic anhydride as the comonomer in the vinyl acetate copolymer latex of the coating composition of the present invention results in unexpected improvements over coating compositions which contain as the latex binder a copolymer of vinyl acetate and maleic acid as exemplified below in the examples. In the latter case, the emulsion viscosity is higher and, in addition, the coating properties of the composition, when combined with starch, are considerably less desirable than with maleic anhydride. A possible explanation of the improved compatibility of the copolymer composition of the present invention with starch may rest upon the fact that maleic anhydride forms a charge-transfer complex with vinyl acetate, and the charge-transfer complex tends toward grafting-type reactions. Therefore, it is theorized that because the maleic acid is not attached to the vinyl acetate polymer backbone in the same manner as maleic anhydride, there are the unexpected differences between the two coating compositions containing the respective latices. However, it is recognized that at some time following the copolymerization of vinyl acetate and maleic anhydride, the maleic anhydride moiety will be converted to the corresponding maleic acid moiety. Accordingly, the coating composition of the present invention encompasses those compositions that contain a latex which was originally formed from a charge-transfer complex between maleic anhydride and vinyl acetate even though all the maleic anhydride has been converted to the acid form.

The following examples illustrate embodiments of this invention. It is to be understood, however, that these are for illustrative purposes only and are not intended to be wholly definitive as to the operating conditions and scope for all the contemplated embodiments of the invention.

EXAMPLE 1

This example illustrates the details of the delayed addition procedure for preparing a 99.5 wt. %/0.5 wt. % vinyl acetate/maleic anhydride copolymer latex employing non-solubilizing anionic surfactant and the use of the resulting latex in a coating color composition.

To a 2-liter reaction vessel were charged:

| | |
|---|---|
| Deionized water | 510.0 gm. |
| Sodium sulfate ester of nonyl phenoxypoly(ethyleneoxy)ethanol[1] | 6.0 gm. |
| Ammonium ferric sulphate | trace |
| Sodium persulfate (SPS) initiator | 4.0 gm. |

[1]Alipal CO-433 surfactant which was 29.5% active or 2.0 wt. % based on weight of vinyl acetate monomer.

The pH of the foregoing solution was adjusted to 4.0 with $H_3PO_4$ and external heat was supplied to the vessel while purging its contents with nitrogen. After the initial charge to the vessel had reached 50° C., 50 ml. of vinyl acetate were added and sodium formaldehyde sulfoxylate (SFS) and tertiary butylhydroperoxide (TBHP) were slowly added as the reducing agents or activators. After the initiation of polymerization was observed, two delay solutions were slowly added to the heel in the reactor over a three and a half hour period. Delay solution 1 comprised 950 gm. of vinyl acetate and 5 gm. of maleic anhydride. Delay solution 2 comprised 66 gm. of the surfactant dissolved in 100 gms. of water. During the three and a half hour addition period, the reaction temperature was maintained at 48°–57° C. by closely controlling the addition rate of the activator. At the completion of the reaction, a stable, blue-white latex was obtained that had a uniform particle size of 800 to 3000 Å, (0.08–0.3 microns) a total solids content of 56.5% by weight, an intrinsic viscosity of 1.18, and viscosities of 450 and 232.5 at 12 and 60 RPM, respectively.

The following paper coating composition was prepared utilizing the resulting latex from this example:

| Ingredient | Parts by Weight |
|---|---|
| Predispersed HT clay | 100 |
| Latex | 18 |
| TSPP[1] | 0.05 |
| Water - sufficient to provide 60% total solids. | |

[1]TSPP = trisodium polyphosphate used as a dispersing agent for the pigment.

The above coating color was applied to a paper based stock, 42 lbs. (19 kg.) per 3300 sq. ft. (300 m.²), at a rate of 10 to 12 lbs. (4.6–5.4 kg.) of dry coating per 3,000 sq. ft. (276 m.²). The coated paper was immediately dried in an air-heated oven at 122° C. for about 30 seconds, conditioned overnight at 72° C. and 50% relative humidity, supercalendered by two passes at 55° to 60° C. and about 500 lbs. per linear inch nip pressure (89.3 kg/cm.) and allowed to condition prior to testing.

The reaction conditions of the latex preparation and the analytical data of the latex are set forth in Table 1 below. The coating properties of the composition of this example are summarized in Table 2 below.

In Table 2,, color viscosity is the viscosity of the coating color measured with a Brookfield Viscometer after 1 hour. The coating gloss was measured in accordance with TAPPI Standard T-480 m-51. The wet pick measurement was performed according to Air Products and Chemicals, Inc. laboratory test procedure 62-001 and the wet rub resistance was determined by Air Products and Chemicals laboratory test procedure 62-016.

In the wet pick procedure, a wedge plate graduated in ink thickness from 0.0–1.0 mils was printed on the coated paper using a #3 tack graded ink and a Vandercook proof press. The coated paper was pre-wet with water using a rubber squeegee to doctor off the excess water just prior to printing. The thinner the ink film, the more tack and pull it exerts on the coating causing it to pick. The mil thickness at which the wet pick stops is set forth in Table 2. The lower mil levels represent greater wet pick strength.

In the wet rub procedure, 3 drops of distilled water were applied to the coated paper from a height of one inch. The water was allowed to stand for one minute. It was then rubbed off with the index finger using five medium straight line strokes which were carried onto a sheet of black (2–2½″) paper. After drying the black paper, the amount of pigment transferred was compared to a set of standards. A number 8 represents no pigment transfer, i.e. excellent wet rub, while a 1 rating would equal very poor wet rub, with excessive pigment on the black paper.

The IGT pick values were obtained by the TAPP Standard T-499 IGT pick test using an IGT Dynamic Pick Tester, No. 5 tack graded ink, a "B" string setting, and a 50 kg. load.

Example 2

To the same 2-liter reaction vessel used in Example 1 were charged:

| Deionized water | 700 gm. |
| Surfactant[1] | 20 gm. |
| Sodium persulfate initiator | 3.0 gm. |

[1] Two percent by weight based on the weight of vinyl acetate of a phosphate surfactant sold under the trademark Wayfos D-10-N and having the following structural formula:

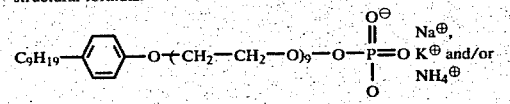

The pH was adjusted to 6.5 with 28% ammonium hydroxide, and the heel was heated to 75° C. while purging with nitrogen. Polymerization was initiated by the slow addition of first delay solution comprising 500 gm. of vinyl acetate and 50 gm. of maleic anhydride and second delay solution comprising 500 gm. of vinyl acetate monomer. The first delay solution was added over a period of 3 hours during which time the reaction temperature ranged from 75° to 79° C. After the final addition of delay solution 1, delay solution 2 was added over a period of 1.5 hours. The residual vinyl acetate was reduced to less than 0.5% by the final addition of an initiator-activator combination of 1 gm. TBHP and 1 gm. SFS. The total delayed time for the addition of the vinyl acetate monomer (VAC) was 5 hrs., 35 min. The resulting latex was recovered and found to have a total solids content of 57.4% by weight, a uniform particle size of 1000 to 4000 Å, an intrinsic viscosity of 0.93, and viscosities of 350 and 173 at 12 and 60 RPM, respectively. The reaction conditions and analytical data are summarized in Table 1 below.

The vinyl acetate/maleic anhydride latex of this example was incorporated into the same paper coating composition as in Example 1, and the results are summarized in Table 2 below.

EXAMPLES 3–10

The delayed addition procedure of Example 1 was followed in these examples except that the ratio of vinyl acetate to maleic anyhdride (MA), the amount and type of surfactant or combination of surfactants, the amount of SPS and TBHP used and the total delay time for the addition of VAC to the reaction were varied as indicated in Table 1 below. The reaction conditions and analytical data of the resulting latex and the coating properties of the respective coating compositions using the same formulation set forth in Example 1 are also set forth in Tables 1 and 2.

EXAMPLE 11

To a 56 liter (15 gallon) reactor were charged:

| Deionized water | 10.9 kg. |
| Ferrous sulfate | 2 gm. |
| Sodium persulfate | 79 gm. |
| Surfactant of Example 1 (Alipal CO 433) | 314 gm. |

The pH was adjusted to 3.5 with 50% $H_3PO_4$ solution (~3 ml) and heat was supplied to the vessel. Nitrogen was slowly purged into the vessel until the initial charge had reached 40° C., the nitrogen purge was terminated and 1450 gm. of monomer mix (total monomer mix: 26,518 gm. VAC plus 176 gm. MA dissolved in VAC) were added to the reactor. The reaction was initiated with a slow stream of 2 wt. % SFS. After initiation had been obtained, the temperature was allowed to rise to 50° C. at which time both the monomer mix and the aqueous delays were started. The aqueous delay consisted of:

| Deionized water | 8366 gm. |
| Sodium persulfate | 138 gm. |
| Surfactant of Example 2 (Wayfos D-10-N) | 117 gm. |
| Surfactant of Example 1 (Alipal CO 433) | 2450 gm. |
| Ammonium hydroxide (28% concentration) | 80 gm. |

The monomer mix was added for a period of 3¼ hours while the aqueous delay was continued for an additional ¼ hour. As soon as the monomer mix was completely added, an additional 2946 gm. of VAC was immediately delayed to the reactor at such a rate so as to finish at the same time of the aqueous delay. The reaction was maintained at 56° to 57° C. with cooling while the free VAC content was maintained at 6 to 8 wt. % during the 3¼ hour period of the run and then lowered to or below 6 wt. % just before addition of the final VAC. The pH was maintained within the range of 3.5 to 4.5 during the run. This range was maintained by controlling the amount of ammonium hydroxide added to the aqueous delay. When the free VAC had been lowered to less than 2 wt. % by the 2 wt. % SFS delay, the residual VAC was finished to less than 0.3 wt. % with a redox shot of 10 wt. % TBHP and 10 wt. % SFS. The wt. % in each case is based on the total amount of VAC charged to the system. The pH was then raised to 5.5 to 6.0 with 14 wt. % OH and the latex product was filtered.

The reaction conditions and analytical data for the resulting latex and the coating properties of this example using the same formulation and procedures set forth in Example 1 are summarized in Tables 1 and 2 below.

EXAMPLE 12

The procedure of preparing the latex in Example 11 was followed in this example except for the type and amount of surfactants which are summarized under the reaction conditions set forth in Table 1. The analytical data of the latex and the coating properties of the color composition of this example using the same formulation and procedures of Example 1 are also summarized in Tables 1 and 2 below.

TABLE 1

| | REACTION CONDITIONS | | | | | |
|---|---|---|---|---|---|---|
| | VAC/MA WT. RATIO | SURFACTANT 1,% | SURFACTANT 2,% | SPS[9] gm. | TBHP[10] gm. | VAC Delay Timer |
| EXAMPLE | | | | | | |
| 1 | 99.5/0.5 | 2.0[1] | — | 5.3 | 1.0 | 4 hr., 10 min. |
| 2 | 99.5/0.5 | 2.0[2] | — | 5.0 | 1.0 | 5 hr., 35 min. |
| 3 | 99.5/0.5 | 2.0[2] | — | 5.5 | 1.0 | 4 hr., 10 min. |
| 4 | 99.5/0.5 | 2.0[3] | 1.0[2] | 5.6 | 1.0 | 4 hr., 25 min. |
| 5 | 99.5/0.5 | 2.0[2] | 1.0[1] | 3.4 | 1.0 | 6 hr., 15 min. |
| 6 | 99/1.0 | 3.1[1] | 1.0[2] | 7.0 | — | 2 hr., 20 min. |
| 7 | 99.4/0.6 | 2.0[4] | 0.3[2],[8] | 13.7 | — | 1 hr., 54 min. |
| 8 | 99.4/0.6 | 1.0[4] | 0.5[5] | 13.5 | — | 1 hr., 57 min. |
| 9 | 99.4/0.6 | 2.0[6] | 0.3[2],[8] | 13.5 | — | 4 hr., 30 min. |
| 10 | 98/2.0 | 2.0[2] | — | 5.0 | — | 4 hr. |
| 11 | 99.5/0.5 | 1.1[1] | 0.3[2],[8] | 217 | 265 | 3 hr., 30 min. |
| 12 | 99.5/0.5 | 2.5[1] | 0.3[2],[8],[11] | 217 | 265 | 3 hr., 30 min. |
| CONTROL | | | | | | |
| 1-5 | 99.5/0.5[7] | 2.0[1] | — | 3.0 | 1.0 | 3 hr., 5 min. |

NOTES:
[1] Sodium sulfate ester of nonyl phenoxypolyethyleneoxy(ethanol) - (Alipal CO-433), 29.5% active.
[2] The phosphate surfactant defined under Example 2 - (Wayfos D-10-N), 100% active.
[3] Polyoxyethylene-polyoxypropylene glycol in which polyoxypropylene chain has a molecular weight of 1500 to 1800 and the polyoxyethylene content makes up 80 to 90% of the total (Pluronic F-68), 100% active.
[4] Sodium sulfate ester of nonylphenoxypoly(ethylene oxy)ethanol (Polystep B-1), 60% active.
[5] Disodium-4-dodecyl-oxydibenzene sulfonate (Dowfax 2A-1), 45% active.
[6] Disodium nonylphenyl polyethylene sulfosuccinate (Aerosol A-103) 35% active.
[7] Maleic acid.
[8] Used principally as a buffering agent and not as a surfactant.
[9] Sodium persulfate.
[10] Tertiary butyl hydroperoxide.
[11] About 0.4% sodium vinyl sulfonate was added in addition to surfactant 2.

| | ANALYTICAL DATA | | | | | |
|---|---|---|---|---|---|---|
| | INTRINSIC VISCOSITY | VISCOSITY @ | | | RANGE OF PARTICLE SIZE, Microns | % SOLIDS |
| | | 12RPM | 50RPM | 60RPM | | |
| EXAMPLE | | | | | | |
| 1 | 1.18 | 450 | NA[1] | 232.5 | 0.08-0.3 | 56.5 |
| 2 | 0.93 | 350 | NA | 173 | 0.1-0.4 | 57.4 |
| 3 | 1.10 | 285 | NA | 132.5 | 0.08-0.3 | 57.4 |
| 4 | 1.15 | 3140 | NA | 1202 | 0.08-0.3 | 56.5 |
| 5 | 1.55 | 837 | NA | 342 | 0.08-0.3 | 55.0 |
| 6 | NA | NA | 157.0 | NA | 0.1-0.4[2] | 59.6 |
| 7 | NA | NA | <150 | NA | 0.1-0.4 | 56.0 |
| 8 | NA | NA | 130.4 | NA | 0.1-0.4 | 57.2 |
| 9 | NA | NA | NA | NA | 0.08-0.3 | 55.4 |
| 10 | NA | NA | NA | NA | ~0.5 | 58.1 |
| 11 | NA | NA | NA | NA | 0.08-0.3 | 56.0 |
| 12 | 0.81 | NA | NA | NA | 0.08-0.1 | 56.0 |
| CONTROL | | | | | | |
| 1-5 | 1.45[3] | 350[3] | 130[3] | NA | 0.08-0.3 | 48.0 |

[1] NA = Not Available
[2] Estimated value
[3] Typical value

TABLE 2

| | COATING PROPERTIES | | | | | |
|---|---|---|---|---|---|---|
| | COLOR VIS.1 HR. | 75% GLOSS | WET PICK | WET RUB | IGT PICK | CONTROL IGT PICK |
| EXAMPLE | | | | | | |
| 1 | 728 | 47.3 | 0.15 | 4 | 284 | 300 |
| 2 | 124 | 46.5 | 0.15 | 5½ | 205 | 300 |
| 3 | 570 | 48.4 | 0.5 | 4½ | 225 | 300 |
| 4 | 920 | 48.6 | 0.25 | 5½ | 249 | 300 |
| 5 | 256 | 50.2 | 0.3 | 5 | 266 | 300 |
| 6 | NA | NA | NA | NA | NA | NA |
| 7 | 220 | 45.3 | 0.3 | 4 | 270 | 350 |
| 8 | 180 | 47.3 | 0.45 | 4 | 195 | 350 |
| 9 | 1110 | 41.5 | 0.15 | 5 | 408 | 422 |
| 10 | 512 | 52.8 | 0.4 | 3 | <100 | 263 |
| 11 | NA | NA | NA | NA | NA | NA |
| 12 | 220 | 44.0 | 0.15 | 5 | 380 | 380 |
| CONTROL | | | | | | |
| 1 | 380 | 48.2 | 0.15 | 5½ | 300 | |
| 2 | NA | NA | 0.15 | NA | 350 | |
| 3 | NA | 44.0 | 0.15 | 5 | 422 | |
| 4 | NA | 44.0 | 0.15 | 5 | 263 | |

TABLE 2-continued

COATING PROPERTIES

| 5 | NA | 43.0 | 0.15 | 5 | 380 |

CONTROLS 1-5

To a 3-liter vessel were charged:

| | |
|---|---|
| Deonized water | 600.0 gm. |
| Octyl phenoxy polyethylene oxyethanol[1] | 27.0 gm. |
| Octyl phenoxy polyethylene oxyethanol[2] | 10.0 gm. |
| Nonylphenoxypoly(ethyleneoxy) ethanol phosphate[3] | 7.0 gm. |
| Ferrous sulfate | trace |
| Potassium persulfate | 8.0 gm. |
| Disodium phosphate | 0.6 gm. |

[1] A non-ionic surfactant containing 30 moles ethylene oxide (E.O.) per molecule.
[2] A non-ionic surfactant containing 10 moles E.O per molecule.
[3] An anionic phosphate surfactant.

The charge in the vessel was purged with nitrogen and heated to 30° C. 100 gm. of VAC were added to the vessel and the polymerization was initiated by the slow addition of 1 gm. of SFS. After the temperature had peaked, 75 gm. of additional VAC were added with a second slow addition of 1 gm. of SFS.

Simultaneously, a stream was added of aqueous maleic acid which had been buffered to a pH of 2.0 with ammonium hydroxide. During the addition of 840 gm. VAC and 7 gm. maleic acid, the temperature in the vessel was maintained at 50° C. The residual VAC content was reduced to less than 0.5% by the addition of 1 gm. TBHP. The resulting latex binder had a total solids content of 48% by weight and a particle size of 800 to 3000 Å and is representative of the best available polyvinyl acetate latex on the market today.

The latex was combined into five separate coating compositions using the same formulation as that set forth in Example 1. The reaction conditions and the analytical data for the latex are summarized in Table 1 above. The coating properties for the four coating colors are identified and summarized in Table 2 above as Controls 1, 2, 3, 4 and 5, respectively.

The five IGT Pick values for the controls that correspond to the same coating conditions for the respective examples are placed in Table 2 opposite the corresponding IGT Pick values of the examples for ease in comparison. This comparison illustrates the criticality that the amount of maleic anhydride, the choice of surfactants and the range of particle size of the latex has on the coating compositions of this invention. The Example 12 composition has the same IGT Pick value as that of the control and has better overall coating characteristics.

EXAMPLES 13-16

These examples illustrate the synergistic improvement in the coating compositions of this invention when 12 parts by weight of the latex prepared using the respective procedures of Examples 1, 2 and 11 are replaced by 12 parts of starch having a viscosity of 3345 cp. and containing 0.02 wt. % enzymes.

The procedures set forth in Example 1 were followed to produce a coated paper from coating colors containing the respective latices. The paper was found to have the IGT Pick characteristics for each of the inks listed in Table 3 below. The pick values of these examples are compared with that of the comparable pick values of either Control 1 or 4 whichever is applicable.

TABLE 3

| | | Without Starch | | | With Starch | | |
|---|---|---|---|---|---|---|---|
| Example | Latex Procedure Ex. | IGT Pick | Control IGT Pick | Ink | IGT Pick | Control IGT Pick | Ink |
| 13 | 1 | 252 | 263[1] | 6B | 310 | 212 | 2 |
| 14 | 2 | 191 | 263[1] | 6B | 306 | 173 | 2 |
| 15 | 2 | 205 | 300[2] | 6B | 410 | 298 | 2 |
| 16 | 11 | 284 | 300[2] | 6B | 199 | 128 | 2 |

[1] Control 4
[2] Control 1

NOTE 1:
Starch has an IGT Pick value of less than 100.

The data set forth in Table 3 above illustrates the improvement in pick characteristics that the replacement of a portion of the latex by starch has in the claimed composition. This improvement can be compared to the lack of similar improvement in the control compositions. Therefore, it can be concluded that the substitution of maleic anhydride or maleic acid of the latex used in the control in the manner described above dramatically increases the compatability to the coating composition to accept the starch component as a cobinder.

What is claimed is:

1. A coating composition comprising a latex which contains a copolymer of vinyl acetate in the range of about 95 to 99.9% by weight and maleic anhydride in the range of about 5.0 to 0.1% by weight polymerized in an aqueous medium in the presence of a surfactant which prevents the resulting vinyl acetate-maleic anhydride copolymer from becoming solubilized in said aqueous medium and a free radical initiator, said latex being characterized by having a solids content of at least 50% by weight and a copolymer particle size of not more than 0.5 micron.

2. The coating composition of claim 1 wherein said surfactant is an anionic surfactant.

3. The coating composition of claim 1 wherein said surfactant is a combination of anionic and nonionic surfactants.

4. The coating composition of claim 1 wherein said surfactant is a water soluble surfactant containing 10 to 22 carbon atoms in its hydrophobic moiety.

5. The coating composition of claim 4 wherein said surfactant contains at least four ethylene oxide units in its hydrophilic moiety.

6. The coating composition of claim 4 wherein said surfactant is an anionic surfactant.

7. The coating composition of claim 5 wherein said surfactant is an anionic surfactant.

8. The coating composition of claim 1 wherein said surfactant is a water soluble anionic surfactant having the general formula:

$$R(OCH_2CH_2)_nXM$$

wherein
- R is an alkyl, alkaryl or cyclic alkyl radical having 10 to 22 carbon atoms,
- X is a sulfate, sulfonate, sulfosuccinate or phosphate radical,
- M is an alkali metal, an alkaline earth metal or an ammonium radical, and
- n is an interger of 4 to 30.

9. The coating composition of claim 8 wherein said surfactant also contains a non-ionic surfactant.

10. The coating composition of claim 1 wherein mineral pigments are contained therein so that the weight ratio of the mineral pigments to said latex is in the range of 3.33:1 to 50:1.

11. A coating composition comprising a latex which contains a copolymer of vinyl acetate in the range of about 98 to 99.6% by weight and maleic anhydride in the range of about 2 to 0.4% by weight polymerized in an aqueous medium in the presence of a water soluble anionic surfactant which prevents the resulting vinyl acetate-maleic anhydride copolymer from becoming solubilized in said aqueous medium and a free radical initiator, said coating composition being characterized by having a solids content of at least 55% by weight and a particle size in the range of 0.05 to 0.3 micron.

12. The coating composition of claim 11 wherein a portion of the latex is replaced by starch so that the final composition contains up to 9 parts by weight starch to 1 part by weight latex without substantial loss of binding strength.

13. The coating composition of claim 11 wherein a portion of the latex is replaced by starch so that the final composition contains up to 3 parts by weight starch to 1 part by weight latex without substantial loss of binding strength.

14. The coating composition of claim 11 wherein mineral pigments are contained therein so that the weight ratio of the mineral pigments to said latex is in the range of 3.33:1 to 50:1.

15. A coating composition comprising 3.33 to 50 parts by weight of mineral pigments and one part by weight latex which contains a copolymer prepared by copolymerizing vinyl acetate in the range of about 95 to 99.9 parts by weight and maleic anhydride in the range of about 5.0 to 0.1 parts by weight in an aqueous medium in the presence of a surfactant which prevents the resulting vinyl acetate-maleic anhydride copolymer from becoming solubilized in said aqueous medium and a free radical initiator, said coating composition being characterized by having a solids content of at least 50% by weight and a particle size of not more than 0.5 micron.

16. The coating composition of claim 15 wherein said vinyl acetate is in the range of about 98 to 99.6 parts by weight and said maleic anhydride is in the range of about 2.0 to 0.4 parts by weight.

17. The coating composition of claim 15 wherein at least a part of said maleic anhydride has become converted to maleic acid.

* * * * *